May 8, 1923.
H. A. THOMPSON
AUTOMOTIVE BRAKE VALVE
Filed May 31, 1922
1,454,525
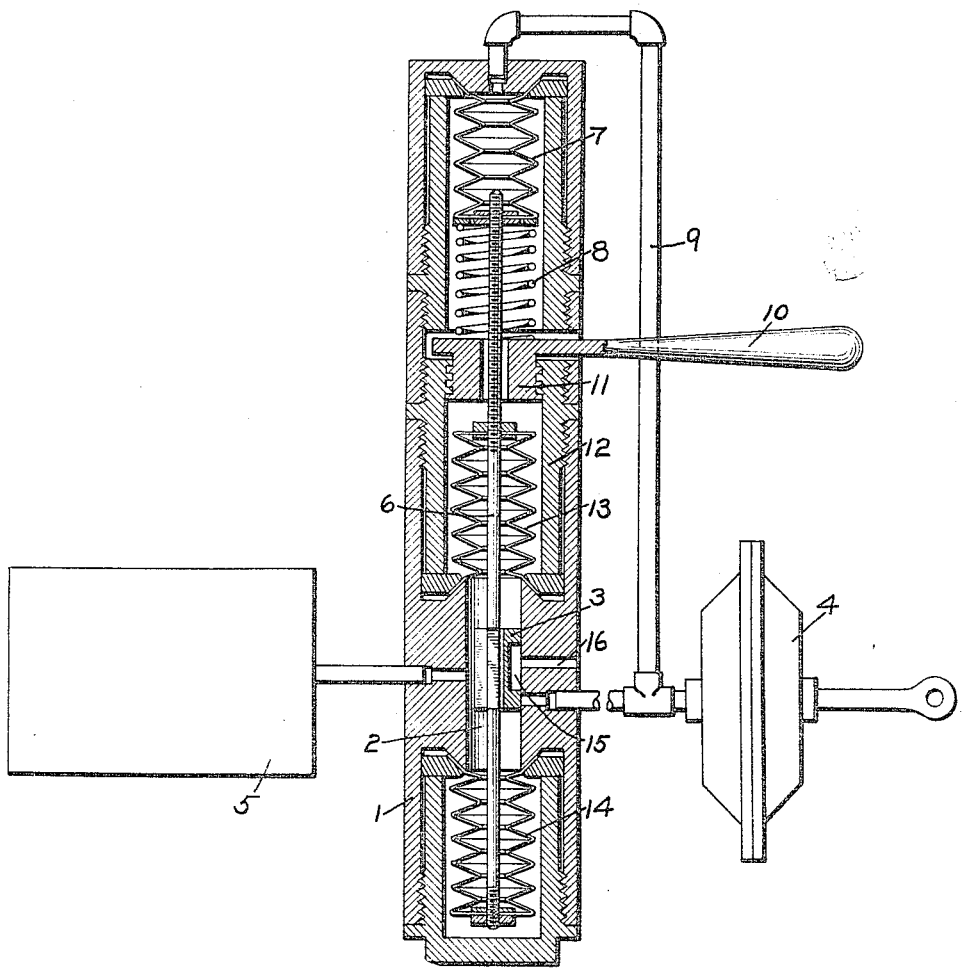
INVENTOR
HOWARD A. THOMPSON
BY
ATTORNEY Patented May 8, 1923.

1,454,525

UNITED STATES PATENT OFFICE.

HOWARD A. THOMPSON, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE VALVE.

Application filed May 31, 1922. Serial No. 564,681.

*To all whom it may concern:*

Be it known that I, HOWARD A. THOMPSON, a citizen of the United States, residing at Pittsburgh, in the county of Allegheny and State of Pennsylvania, have invented new and useful Improvements in Automotive Brake Valves, of which the following is a specification.

This invention relates to a brake controlling valve device more particularly adapted for use in connection with a fluid pressure operated automotive brake.

The principal object of my invention is to provide an improved brake controlling device for controlling and regulating the pressure of fluid supplied for operating the brakes.

In the accompanying drawing, the single figure is a diagrammatic view of an automotive brake equipment, showing the improved brake controlling valve device in section.

As shown in the drawing, the brake controlling valve device may comprise a casing 1 having a valve chamber 2, containing a slide valve 3 for controlling the admission and exhaust of fluid under pressure to and from a brake cylinder 4. The valve chamber 2 is connected to a source of fluid under pressure, such as a reservoir 5 and for operating the valve 3, a valve stem 6 is provided, which is connected at one end to a multiple fin diaphragm 7. Said diaphragm is subject on one side to the pressure of a coil spring 8 and on the opposite side to the pressure of fluid in the brake cylinder 4 as supplied through pipe 9.

The pressure exerted on the diaphragm 7 by the spring 8 is varied by means of the operation of a handle 10. Said handle is provided with a hub 11 having screw threads of coarse pitch adapted to engage corresponding screw threads of a bushing or sleeve member 12 which is screwed into the casing 1, so that by rotating the handle 10, the spring engaging face of the handle will be raised or lowered and the spring 8 compressed or released.

In order to prevent leakage from the valve chamber 2, multiple fin diaphragms 13 and 14 may be employed at opposite ends of the valve chamber, one end of the valve stem 6 being secured by a leak tight connection to the diaphragm 14 and a leak tight connection being provided where the stem 6 passes through the diaphragm 13.

In operation, when it is desired to apply the brakes the handle 10 is turned so that the spring 8 is compressed. The diaphragm 7 is then moved by the pressure of the spring and the valve stem 6 is thereby operated to shift the valve 3 and open communication for supplying fluid under pressure from the reservoir 5 and valve chamber 2 to the brake cylinder 4. The pressure of fluid supplied to the brake cylinder 4 acts on the diaphragm 7 and when the brake cylinder pressure has been raised to a point slightly exceeding the pressure of the spring the diaphragm 7 will be operated to shift the valve stem 6 and slide valve 3 to cut off the further flow of fluid to the brake cylinder, the valve being lapped, as shown in the drawing.

If leakage should occur from the brake cylinder, the reduced brake cylinder pressure on the diaphragm 7 will permit the spring to act and shift the slide valve 3, so that fluid will be supplied to the brake cylinder to compensate for the leakage.

The brake cylinder pressure may be increased by turning the handle 10 so as to further compress the spring 8 and thereby cause the valve 3 to again move to its open position. When the brake cylinder pressure has been increased to correspond with the increased spring pressure effected by the movement of the handle 10, the valve will be moved to lap position, as before described.

The brakes may be released by turning the handle 10 so as to relieve the spring 8 of pressure and then the brake cylinder pressure acting on the opposite side of the diaphragm will operate to shift the diaphragm and valve stem 6 so that the valve 3 will be moved to release position, in which cavity 15 connects the brake cylinder 4 with an atmospheric exhaust port 16.

Having now described my invention, what I claim as new and desire to secure by Letters Patent, is:

1. A brake valve device comprising a casing having a valve chamber, a valve therein, a spring, a multiple fin diaphragm subject to the pressure of said spring for operating said valve, and manually operated means for varying the force of the spring.

2. The combination with a brake cylinder, of a brake valve device comprising a casing having a valve chamber, a valve therein for controlling the pressure in the brake cylinder, a spring, a multiple fin diaphragm subject to the opposing pressures of the brake cylinder and said spring for operating said valve, and manually operated means for varying the force of said spring.

3. A brake valve device comprising a casing having a valve chamber, a valve therein, a valve stem for operating said valve, and a multiple fin diaphragm secured to said stem for preventing leakage from the valve chamber.

4. A brake valve device comprising a casing having a valve chamber, a valve therein, a valve stem for operating said valve, and multiple fin diaphragms having a leak tight connection with the valve stem at opposite sides of the valve chamber to prevent leakage from said valve chamber.

5. A brake valve device comprising a casing having a valve chamber, a valve therein, a valve stem connected to said valve, a multiple fin diaphragm for operating said valve stem and valve, and multiple fin diaphragms having a leak tight connection with said valve stem at opposite sides of the valve chamber for preventing leakage from said valve chamber.

In testimony whereof I have hereunto set my hand.

HOWARD A. THOMPSON.